Oct. 15, 1929.  I. J. McCULLOUGH  1,731,388
PIPE CUTTER
Filed Feb. 1, 1928   2 Sheets-Sheet 2
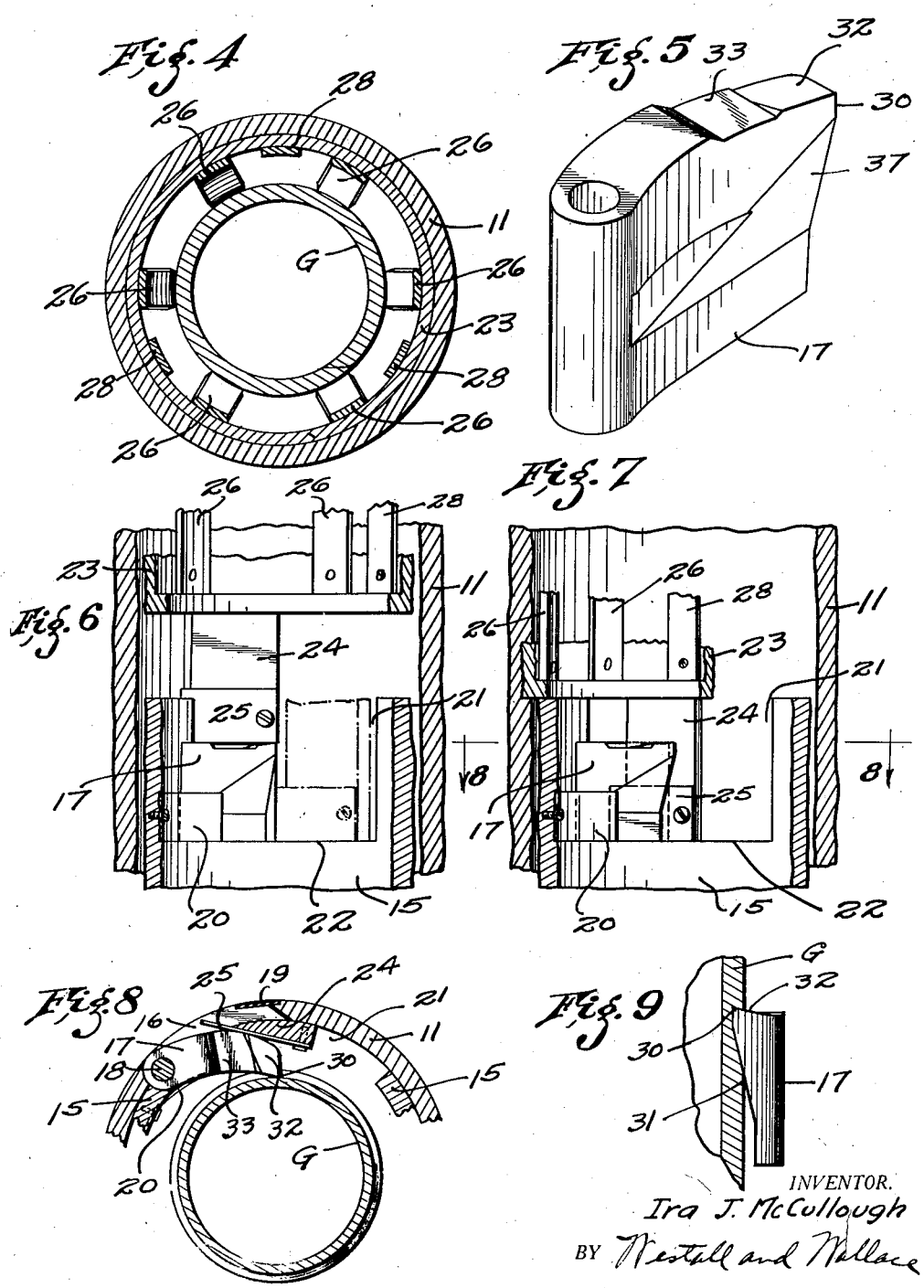
INVENTOR.
Ira J. McCullough
BY Westall and Wallace
ATTORNEYS Patented Oct. 15, 1929

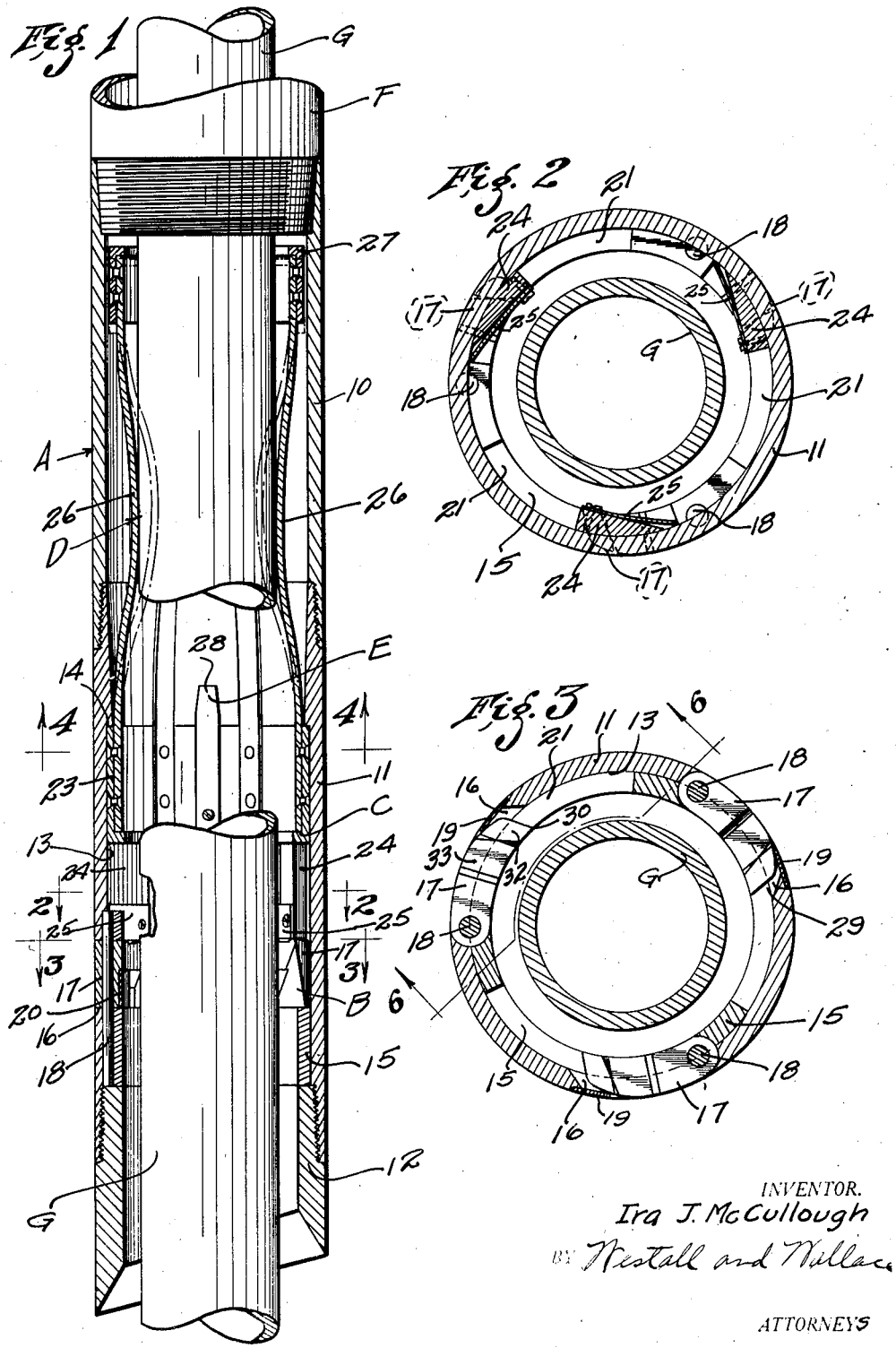

1,731,388

UNITED STATES PATENT OFFICE

IRA J. McCULLOUGH, OF WALNUT PARK, CALIFORNIA

PIPE CUTTER

Application filed February 1, 1928. Serial No. 250,989.

This invention relates to a device for severing tubular or cylindrical members, and is especially applicable to the well drilling art wherein pipe is to be cut in the well hole. Such a tool is desirable for cutting drill pipes or stems when the latter become lodged in the hole.

The objects of this invention are first, to provide improvements in outside drill pipe cutters of the character described in patent No. 1,672,330, dated June 5, 1928, wherein the cutter mechanism is normally non-operable upon rotation of the device, but is shiftable longitudinally into cutter operating position; second to provide means to automatically lock the parts in cutter operating position; and third to provide cutters pivoted on one of said members to be swung from retracted to cutting position and which will support the work being severed.

These objects together with other objects and corresponding accomplishments are obtained by means of the embodiment of my invention illustrated in the accompanying drawings, in which:

Fig. 1 is an elevation principally in section of a cutter tool in position about a drill pipe to be cut, a portion of the pipe being broken away to better show the construction, the parts of the cutter being in non-cutting position; Figs. 2, 3, and 4 are sections as seen on the lines correspondingly numbered in Fig. 1; Fig. 5 is a perspective view of a knife blade on an enlarged scale; Fig. 6 is an axial section as seen on the line 6—6 of Fig. 3 showing in full lines a fragment of the tool with the parts in non-cutting position, and in dotted lines in initial cutter operating position; Fig. 7 is a view similar to Fig. 6 showing the parts in position for cutting the work; Fig. 8 is a section on the line 8—8 of Fig. 7 showing a fragment of the tool; and Fig. 9 is a vertical section through a pipe being cut with a cutter disposed in the incision.

Referring with more particularity to Fig. 1, the tool consists of a tubular cage A carrying cutters B. Mounted within the cage so as to be longitudinally shiftable within a limited distance and rotatable is a cutter actuator C. Connected to the cutter actuator is a means D for yieldingly grasping the work to be cut. Mounted upon the actuator are locking catches E for holding the actuator in cutter operating position. The tool is manipulated by means of a string F, in this instance being wash pipe. The work to be cut consists of a drill pipe indicated by G.

Referring more specifically to the cage, it consists of a threaded tubular section 10 having internally tapered threads at the ends, the lower end being secured to a cutter carrier section 11 by means of a male threaded member. At the lower end of the cutter carrier is a shoe 12 designed to pass over obstructions and aid in the lowering of the pipe. The wash pipe for manipulating the tool is connected to the upper end of the tubular member 10. The cutter carrier has an enlarged bore 13 and is provided with a shoulder 14. A ring 15, best shown in Figs. 1, 3, 6, 7 and 8 is abutted at the lower end by the shoe 12. Openings 16 are provided in the tubular member 11 for the cutters 17. Pins 18 are mounted between the ring 15 and the tubular member 11, there being a pin way cut half in the ring 15 and half in the tubular member 11. After insertion of the ring in place, the pins may be positioned and then the shoe 12 attached to the cutter carrier. Plates 19 prevent the cutters from being swung out beyond the periphery of the carrier. These plates may be set in recesses in the outer surface of the carrier. Leaf springs 20, see Figs. 6, 7 and 8, are attached at one end to ring 15 and bear at the other ends against the cutter 17 tending to hold them in retracted position. These springs are set into recesses in the blades. Slots 21 open at the top are formed in the ring 15, one for each cutter blade. The lower wall 22 of the slots serves as a bearing for the cutter actuator wedges.

The cutter actuator comprises a tubular member 23 of ring form and adapted to be shifted longitudinally between the shoulder 14 in the cage and the top of ring 15. Depending from the ring 23 are wedges 24 adapted to be disposed in the slots 21 in the ring 15. There is a wedge for each cutter.

Each wedge has on its inner surface a leaf spring 25 secured to the wedge at its heel and extending a slight distance beyond the toe.

Secured to the ring 23 and extending upwardly are bowed springs 26. These springs are of semi-elliptic form, their upper ends being secured to a ring 27 slidably mounted in the cage. Also secured to the ring are leaf springs 28 having free upper ends with tension thereon tending to move the free ends outwardly. These springs are of such length that when the ring 23 is in its lower position as shown in Fig. 7, the upper ends will be disposed under the shoulder 14 in the cage. The springs serve as latches and the shoulder 14 as a keeper.

The tool is set before lowering over the pipe G with parts in the position shown in Figs. 1, 2, 3 and 6. The ring 23 or actuator is in its upper position abutting shoulder 14. The wedges 24 rest upon the upper edges of the cutters. It will be noted from Fig. 2 that the leaf springs 25 on the wedges are sprung inwardly from the toes of the wedges and resting against the inner surface of cage 11. The cutters are held in retracted position by the springs 20, the outer surfaces of the cutters being substantially flush with the outer surface of the cage. It will be noted that the tool may be rotated without causing the cutters to be actuated. The tool is placed over the work to be cut, in this instance shown as the pipe G, the central portions of the springs 26 yieldingly engaging the pipe. The tool may be lowered, the springs giving and passing over couplings and other obstructions on the pipe. This will permit the tool to be worked downwardly to the position at which the cut is to be made. Upon reaching this position, the tool is rotated so as to "back it up" and register the wedges 24 with slots 21. The tool is then elevated causing the wedges to ride downwardly in the slots. The catch springs 28 will engage the keeper shoulder 14 and lock the actuator against being shifted longitudinally. The springs 25 will then have disposed themselves in the spaces 29 in front of the toes of the cutters. By turning the tool toward the toes of the cutters, the springs 25 inaugurate projection of the cutters. Rotation is continued, the springs 25 moving back against the surfaces of the wedges 24, and the cutters being further projected as shown in Figs. 7 and 8 to point of engagement with the work. Continued rotation of the tool will cause the wedges to be moved with the tool, there being a yielding resistance to rotation of the wedges by reason of the engagement of springs 26 with the pipe. As the cutters make their incision into the work, the wedges rotate relative to the cage, further projecting the cutters into the work until the cut has been made. There is thus an automatic feed of the cutters which feed depends upon the resistance to inward cutting.

The cutters 17 as best shown in Figs. 5 and 9 have in general an arcuate contour. However, there is an upper cutting point 30 and a trailing inclined inner space indicated by 31. The upper face at the toe is bevelled to slope backwardly from the toe as indicated by 32. Back of the bevel 32 is a pocket portion 33. As the point 30 cuts into the pipe G, a strain is preferably placed upon the latter tending to elevate it. The cutters make an incision edge on the pipe which is undercut inwardly. This aids in holding the knife blades in position. Furthermore, when the cut is completed, the knife blades will tend to ride inwardly over the bevel and maintain the blades below the severed portion of the pipe. Eventually, the blades will ride so far inwardly that the edge of the severed portion of the pipe will rest in the pockets. By elevating the tool, the severed portion of pipe may be raised with it, the knife blades serving to support the pipe.

What I claim is:—

1. A device of the character described comprising relatively rotatable and longitudinally shiftable members, cutters movably accommodated on one of said members for projection from retracted position to cutting position, the other of said members having means shiftable therewith into and normally supported in cutter non-operating position or shiftable into cutter operating position, said means being operable by relative rotation of said members to move said cutters from retracted position to cutting position when the means is disposed in operating position, and means on one of said members for engaging the work to be cut and yieldingly resisting rotation.

2. A device of the class described comprising relatively rotatable and longitudinally shiftable members, cutters mounted to turn on one of said members for projection from retracted position to cutting position, the other of said members having means shiftable therewith into and normally supported in cutter non-operating position or shiftable into cutter operating position said means being operable by relative rotation of said members to move said cutters from retracted position into cutting position when said means is disposed in operating position, and means on one of said members for engaging the work to be cut and yieldingly resisting rotation.

3. A device of the class described comprising relatively rotatable and longitudinally shiftable members, cutters mounted to be swung on one of said members in planes substantially transverse of the axis of rotation of said members from retracted position to cutting position, the other member having inclined surfaces shiftable therewith into and normally supported in cutter non-engaging position or shiftable into cutter engaging position, said means being operable when in engaging position by relative rotation of said members to swing said cutters from retracted position into cutting position, and means on one of said members for engaging the work to be cut and yieldingly resisting rotation.

4. A device of the class described comprising relatively rotatable and longitudinally shiftable members, cutters movably accommodated on one of said members for projection from retracted to cutting position, the other of said members having cutter operating means shiftable therewith into and normally supported in cutter non-operating position or shiftable into cutter operating position, said means being operable by relative rotation of said members to move said cutters from retracted position into cutting position when said means is disposed in operating position, means on one of said members engaging the work to be cut and yieldingly resisting rotation, and automatic means carried by the device to lock said members with said cutter operating means in operating position.

5. A device of the class described comprising relatively rotatable members, cutter blades mounted to be turned on one of said members in planes transverse of the axis of rotation of said members from retracted position into cutting position by relative rotation of said members, said cutter blades having bevelled surface sloping backwardly from the toes whereby to longitudinally overlap the cut made in and support the work, and means on one of said members for engaging the work to be cut and yieldingly resisting rotation.

6. A device of the class described comprising relatively rotatable members, cutter blades mounted to be turned on one of said members in planes transverse of the axis of rotation of said members from retracted position into cutting position, said cutter blades having bevelled surfaces sloping backwardly from the toes whereby to longitudinally overlap the cut made in and support the work, the other member having inclined surfaces for engaging said blades to swing them from retracted position into cutting position by relative rotation of said members, and means on one of said members for engaging the work to be cut and yieldingly resisting rotation.

7. A device of the class described comprising relatively rotatable and longitudinally shiftable members, cutter blades mounted to be turned on one of said members in planes transverse to the axis of rotation of said members from retracted position into cutting position, said cutter blades having upper bevelled surfaces sloping backwardly from the toes whereby to longitudinally overlap the cut made in the work, the other member having inclined surfaces shiftable therewith into and normaly supported in cutter blade non-engaging position or shiftable into cutter blade engaging position, said means being operable by relative rotation of said members to swing said blades from retracted position to cutting position when said surfaces are in cutter engaging position, and means on one of said members for engaging the work to be cut and yieldingly resisting rotation.

8. A device of the class described comprising relatively rotatable and longitudinally shiftable members, cutter blades mounted to be turned on one of said members in planes transverse of the axis of rotation of said members from retracted position into cutting position, said cutter blades having upper bevelled surfaces sloping backwardly from the toes whereby to longitudinally overlap the cut made in the work, the other member having inclined surfaces shiftable therewith into and normally supported in cutter blade non-engaging position or shiftable into cutter blade engaging position operable by relative rotation of said members to swing said blades from retracted position into cutting position when said surfaces are in cutter engaging position, means on one of said members for engaging the work to be cut and yieldingly resisting rotation, and automatic means to lock said members with said surfaces in blade engaging position.

9. A device of the character described comprising relatively rotatable and longitudinally shiftable tubular members, cutter blades mounted to be turned on one of said members in planes transverse of the axis of rotation of said members from retracted position to cutting position, the other member having inclined surfaces shiftable therewith into cutter blade non-engaging position or cutter blade engaging position and operable by relative rotation of said members when said surfaces are in blade engaging position to swing said blades from retracted position into cutting position, one of said members having an internal ledge forming a keeper, cantilever spring leaf latch arms on the other members for engagement of their free ends with said keeper when said members are disposed with said surfaces in blade engaging position and locking said members against shifting, and means on one of said members for engaging the work to be cut and yieldingly resisting rotation.

10. A device of the class described comprising relatively rotatable and longitudinally shiftable tubular members, cutter blades mounted to be turned on one of said members in planes transverse of the axis of rotation of said members from retracted position into cutting position, said cutter blades having upper bevelled surfaces sloping backwardly from the toes whereby to longitudinally overlap the cut made in the work, the other member having inclined surfaces shiftable therewith into cutter blade non-engaging position and cutter blade engaging position and operable by relative rotation of said members when said surfaces are in blade engaging position to swing said blades from retracted position into cutting position, one of said members having an internal ledge forming a keeper, cantilever spring leaf latch arms on said other member for engagement of the free ends thereof with said keeper when said members are disposed with said surfaces in blade engaging position and locking said members against shifting, and means on one of said members for engaging the work to be cut and yieldingly resisting rotation.

11. A device of the class described comprising relatively rotatable tubular members, cutter blades, mounted to be turned on one of said members in planes transverse of the axis of rotation of said members from retracted position into cutting position, said cutter blades having upper bevelled surfaces sloping backwardly from the toes whereby to longitudinally overlap the cut made in the work, the other member having inclined surfaces and being operable by relative rotation of said members to swing said blades from retracted position into cutting position, and means on one of said members to engage the work to be cut and yieldingly resisting rotation.

12. A device of the class described comprising relatively rotatable tubular members, cutter blades mounted to be turned on one of said members in planes transverse of the axis of rotation of said members from retracted position into cutting position, said cutter blades having upper bevelled surfaces sloping backwardly from the toes whereby to longitudinally overlap the cut made in the work and having undercut side faces sloping away from the toes to clear the work, the other member having inclined surfaces and being operable by relative rotation of said members to swing said blades from retracted position into cutting position, and means on one of said members to engage the work to be cut and yieldingly resist rotation.

13. A cutter blade having a body adapted to be pivotally mounted at one end, said body having a cutting toe at the opposite end, an edge face extending transverse to said axis and sloping from said toe inwardly toward said axis and across said face from said toe.

14. A cutter blade having a body adapted to be pivotally mounted at one end, said body having a cutting toe at the opposite end, an edge face extending transverse to said axis and sloping from said toe inwardly toward said axis and across said face from said toe, and an undercut in a lateral face sloping inwardly away from said toe for the purpose of clearing the work to be cut.

In witness that I claim the foregoing I have hereunto subscribed my name this 24th day of January, 1928.

IRA J. McCULLOUGH.